(12) United States Patent
Ban et al.

(10) Patent No.: US 8,752,424 B2
(45) Date of Patent: Jun. 17, 2014

(54) FLOW MEASURING DEVICE

(75) Inventors: Takao Ban, Toyohashi (JP); Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 46 days.

(21) Appl. No.: 13/524,162

(22) Filed: Jun. 15, 2012

(65) Prior Publication Data

US 2013/0019675 A1    Jan. 24, 2013

(30) Foreign Application Priority Data

Jul. 19, 2011    (JP) .................................. 2011-158147

(51) Int. Cl.
*G01F 5/00*    (2006.01)

(52) U.S. Cl.
USPC .......................................................... 73/202

(58) Field of Classification Search
USPC ..................... 73/202, 204.22, 202.5
See application file for complete search history.

(56) References Cited

U.S. PATENT DOCUMENTS

| | | | |
|---|---|---|---|
| 6,332,356 B1 | 12/2001 | Hecht et al. | |
| 6,336,360 B1 * | 1/2002 | Weber | 73/204.21 |
| 6,557,408 B1 * | 5/2003 | Mueller et al. | 73/202.5 |
| 6,647,775 B1 * | 11/2003 | Hecht et al. | 73/202.5 |
| 6,810,730 B2 * | 11/2004 | Lenzing et al. | 73/202.5 |
| 6,973,823 B2 | 12/2005 | Lenzing et al. | |
| 7,059,183 B2 * | 6/2006 | Kikawa et al. | 73/202.5 |
| 2002/0104375 A1 * | 8/2002 | Renninger et al. | 73/202.5 |
| 2005/0109101 A1 | 5/2005 | Frie et al. | |

FOREIGN PATENT DOCUMENTS

| | | |
|---|---|---|
| JP | 2002-506528 | 2/2002 |
| JP | 2004-012274 A | 1/2004 |
| JP | 2004-053600 A | 2/2004 |
| JP | 2005-509150 A | 4/2005 |
| JP | 2005-128038 | 5/2005 |
| JP | 2011-112569 | 6/2011 |

OTHER PUBLICATIONS

Office Action issued Jul. 23, 2013 in corresponding Japanese Application No. 2011-158147 (with English translation).
Office Action issued May 7, 2013 in corresponding Japanese Application No. 2011-158147 (with English translation).
Office Action issued Oct. 22, 2013 in corresponding Japanese Application No. 2013-140326 (with English translation), a divisional application of JP Application No. 2011-158147.

* cited by examiner

*Primary Examiner* — Jewel V Thompson

(57) ABSTRACT

A bypass passage receives a part of air flowing through a duct. A sub-bypass passage is branched from an intermediate portion of the bypass passage to separate dust contained in air flowing through the duct. A flow rate sensor is located in the sub-bypass passage for detecting the flow rate of air. A first wall surface and a second wall surface of the bypass passage are located upstream from the branch. The first wall surface is located on the side of the branch. The second wall surface is opposed to the first wall surface. Both the first wall surface and the second wall surface are curved to direct airflow to move away from the branch.

6 Claims, 4 Drawing Sheets

UPPER SIDE
↕ VERTICAL DI
LOWER SIDE

STREAM ⇒

WIDTH DIRECTION

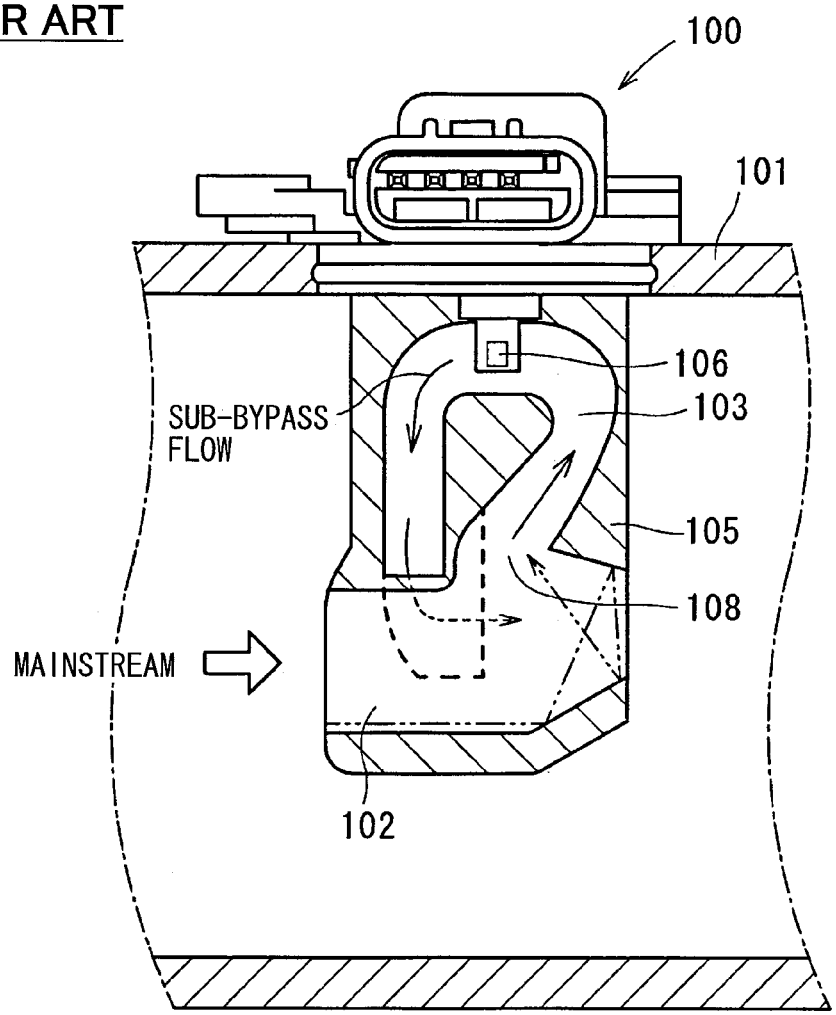

FLOW MEASURING DEVICE

CROSS REFERENCE TO RELATED APPLICATIONS

This application is based on reference Japanese Patent Application No. 2011-158147 filed on Jul. 19, 2011, the disclosure of which is incorporated herein by reference.

TECHNICAL FIELD

The present disclosure relates to an airflow measuring device including a bypass passage for receiving a part of air flowing through a duct, a sub-bypass passage for receiving a part of air branched from the bypass passage, and flow rate sensor located in the sub-bypass passage for measuring airflow.

BACKGROUND

For example, JP-A-2011-112569 discloses an airflow measuring device. As shown in FIG. 5, a conventional airflow measuring device 100 includes a housing 105 and a flow rate sensor 106. The housing 105 has a bypass passage 102 and a sub-bypass passage 103. The bypass passage 102 receives a part of air flowing through a duct 101. The sub-bypass passage 103 receives a part of the air branched from the bypass passage 102. The flow rate sensor 106 is provided in the sub-bypass passage 103 to detect the flow rate of air flowing through the sub-bypass passage 103. The configuration of the branch from the bypass passage 102 into the sub-bypass passage 103 separates dust included in the air flowing through the duct 101 thereby to flow the dust into the bypass passage 102.

In the configuration of FIG. 5, the bypass passage 102 extends straight along the airflow passing as a mainstream in the duct. Dust contained in air passing through the bypass passage 102 moves straight with inertial force thereby to be separated at the branch from the bypass passage 102 into the sub-bypass passage 103.

It is noted that, in the conventional airflow measuring device 100, the passage wall surface of the bypass passage 102 around its outlet is partially directed toward a branch 108 between the sub-bypass passage 103 and the bypass passage 102. In such a configuration, as shown by the two-dot chain arrow in FIG. 5, dust may rarely repeat collision against the passage wall surface to result in reaching the branch 108. In this case, the dust may consequently intrude from the branch 108 into the sub-bypass passage 103.

SUMMARY

It is an object of the present disclosure to produce an airflow measuring device configured to restrict dust from reaching a flow rate sensor.

According to an aspect of the present disclosure, an airflow measuring device comprises a housing having a bypass passage, which is configured to receive a part of air flowing through a duct, and a sub-bypass passage, which is branched at a branch from an intermediate portion of the bypass passage and configured to receive a part of air flowing through the bypass passage. The airflow measuring device further comprises a flow rate sensor located in the sub-bypass passage and configured to detect a flow rate of air flowing through the sub-bypass passage. The branch from the bypass passage into the sub-bypass passage is configured to separate dust contained in air flowing through the duct and to flow the dust into the bypass passage. A passage wall surface defining the bypass passage on an upstream side from the branch includes: a first wall surface located on a side where the sub-bypass passage branches, the first wall surface curving to direct a flow, which is along the first wall surface toward a downstream, to be away from the branch; and a second wall surface opposed to the first wall surface, the second wall surface curving to be away from the branch at least in a portion opposed to the branch.

According to another aspect of the present disclosure, an airflow measuring device comprises a housing having a bypass passage, which is configured to receive a part of air flowing through a duct, and a sub-bypass passage, which is branched at a branch from an intermediate portion of the bypass passage and configured to receive a part of air flowing through the bypass passage. The airflow measuring device further comprises a flow rate sensor located in the sub-bypass passage and configured to detect a flow rate of air flowing through the sub-bypass passage. The branch from the bypass passage into the sub-bypass passage is configured to separate dust contained in air flowing through the duct and to flow the dust into the bypass passage. The housing has an outlet of the bypass passage, the outlet being formed such that a line, which is perpendicular to an opening plane of the outlet, is directed to be away from the branch.

BRIEF DESCRIPTION OF THE DRAWINGS

The above and other objects, features and advantages of the present invention will become more apparent from the following detailed description made with reference to the accompanying drawings. In the drawings:

FIG. 5 is a sectional view showing an airflow measuring device according to a prior art.

DETAILED DESCRIPTION

Figure 1A:
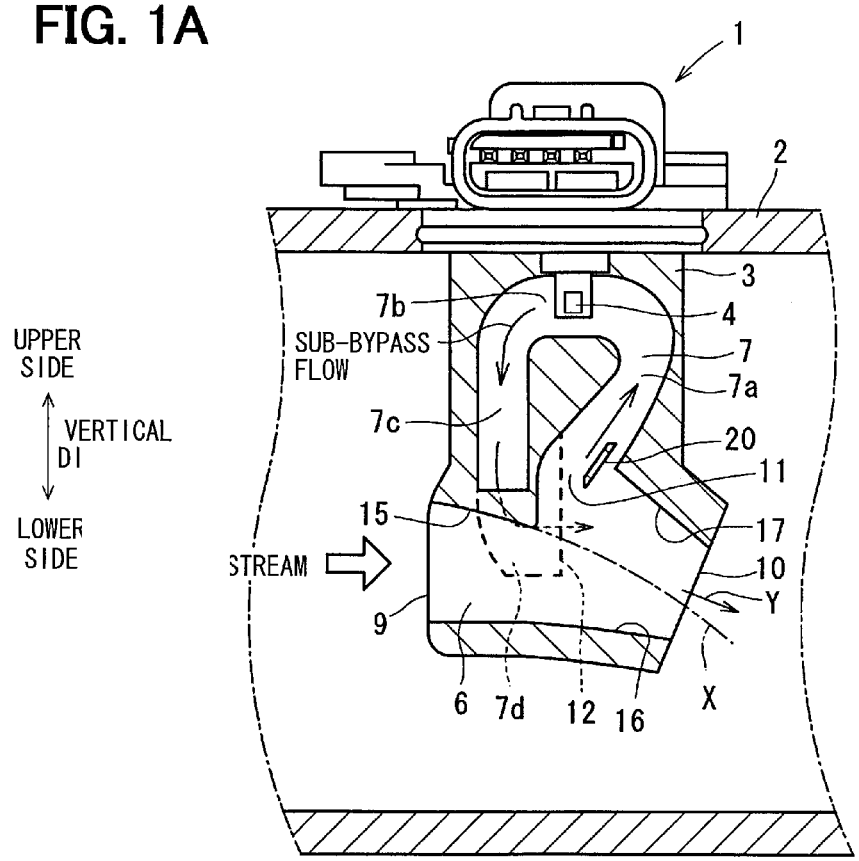
FIG. 1A is a sectional view showing an airflow measuring device according to the first embodiment.

The airflow measurement device according to the present disclosure may include: the housing having the bypass passage, which is configured to receive a part of air flowing through the duct, and the sub-bypass passage, which is branched from the intermediate portion of the bypass passage and configured to receive a part of air flowing through the bypass passage; and the flow rate sensor located in the sub-bypass passage and configured to detect the flow rate of air flowing through the sub-bypass passage. At the branch from the bypass passage into the sub-bypass passage, dust contained in air flowing through the duct is separated, and the dust is flown into the bypass passage.

In the passage wall surface defining the bypass passage on the upstream side of the branch, the first wall surface may be located on the side where the sub-bypass passage branches. In this case, the first wall surface may curve in the from such that the flow along the first wall surface toward the downstream moves away from the branch. Alternatively or in addition, the second wall surface, which is opposed to the first wall surface, may curve to be away from the branch at least in the portion opposed to the branch.

First Embodiment

Configuration of First Embodiment

The configuration of an airflow measuring device 1 of the first embodiment will be described with reference to FIGS. 1A, 1B. The airflow measuring device 1 is, for example, an air flow meter for measuring an amount of intake air flowing into an internal combustion engine of a vehicle such as an automobile. The airflow measuring device 1 is, for example, mounted to a duct 2 connected to a downstream passage of an air cleaner. The airflow measuring device 1 includes a housing 3, a flow rate sensor 4, a circuit module, and the like, which are integrated with each other.

The housing 3 defines therein a bypass passage 6 and a sub-bypass passage 7. The bypass passage 6 receives a part of intake air flowing through a main passage defined in the duct 2. The sub-bypass passage 7 receives a part of air flowing through the bypass passage 6 and branched from an intermediate portion of the bypass passage 6.

The bypass passage 6 includes a bypass inlet 9 and a bypass outlet 10. The bypass inlet 9 opens in the surface of the housing 3 on the upstream side of the mainstream. The bypass outlet 10 opens in the surface of the housing 3 on the downstream side of the mainstream.

The sub-bypass passage 7 includes a sub-bypass inlet 11 and sub-bypass outlets 12. The sub-bypass inlet 11 is branched from an intermediate portion of the bypass passage 6. The sub-bypass outlets 12 return intake air, which flows through the sub-bypass passage 7, into the main passage. The sub-bypass passage 7 is in a shape to cause intake air to U-turn while flowing between the sub-bypass inlet 11 and the sub-bypass outlets 12.

Figure 1B:
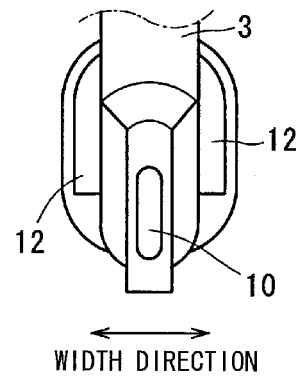
FIG. 1B is a view showing the airflow measuring device when being viewed from the downstream of the airflow measuring device.

Specifically, as shown in FIG. 1A, the sub-bypass passage 7 includes a first passage 7a, a second passage 7b, a third passage 7c, and fourth passages 7d. The first passage 7a guides air, which flows from the sub-bypass inlet 11 into the first passage 7a, outward in the radial direction of the mainstream. That is, the first passage 7a guides the air upward in the vertical direction toward the upper area in the drawing. The second passage 7b thereafter guides the air toward the upstream of the mainstream. The third passage 7c thereafter guides the air inward in the radially direction of the mainstream. That is, the third passage 7c guides the air downward in the vertical direction toward the lower area in the drawing. The fourth passages 7d thereafter guide the air toward the downstream of the mainstream to flow the air out of the sub-bypass outlets 12. As shown in FIG. 1B, the fourth passages 7d are equipped on both sides of the bypass passage 6 in the width direction, respectively. The sub-bypass outlets 12 are located on both sides of the housing 3 in the width direction. The sub-bypass outlets 12 open on the right side and the left side of the bypass outlet 10 toward the downstream of the mainstream. That is, the third passage 7c has the configuration to branch the single passage into the two passages in the width direction in the downstream of the sub-bypass passage 7. The branched two passages flow air therethrough into the fourth passages 7d, respectively. Thus, both the sub-bypass outlets 12 on the left side and the right side flow the air therethrough.

The flow rate sensor 4 is located in the second passage 7b at a peak portion of the U-turn channel defined in the sub-bypass passage 7. The flow rate sensor 4 measures the airflow through the sub-bypass passage 7 and sends an electric signal, such as a voltage signal, as a detection signal. The flow rate sensor 4 is configured with, for example, a heater element and a temperature-sensitive element formed from a thin-film resistive element on the surface of a semiconductor substrate. The heater element and the temperature-sensitive element are connected to a circuit board (not shown) housed in a circuit module.

Feature of First Embodiment

The airflow measuring device 1 has a passage wall surface defining the upstream of the sub-bypass inlet (branch) 11, and the passage wall surface includes a first wall surface 15 located on the side where the sub-bypass passage 7 branches. The first wall surface 15 curves in the shape such that the air flowing toward the downstream along the first wall surface 15 goes away from the branch 11. The passage wall surface defining the upstream of the branch 11 further includes a second wall surface 16, which is opposed to the first wall surface 15. The second wall surface 16 curves such that the air flowing toward the downstream goes away from the branch 11, at least in a portion opposed to the branch 11

Referring to FIG. 1A, the sub-bypass passage 7 is branched and extended upward in the vertical direction of the bypass passage 6. The first wall surface 15 is a portion of the passage wall surface defining the upstream of the branch 11 and located on the upper side in the vertical direction. The second wall surface 16 is opposed to the first wall surface 15 and located on the lower side in the vertical direction.

In the present embodiment, the sub-bypass passage 7 curves such that the sub-bypass passage 7 is in the form of convex upward in the vertical direction toward the branch 11. For example, the first wall surface 15 curves in an arc shape around its center on the lower side in the vertical direction. The second wall surface 16 including its portion opposed to the branch 11 entirely curves downward in the vertical direction. A third wall surface 17 is a passage wall surface opposed to the second wall surface 16 located in the downstream of the bypass passage 6. That is, the third wall surface 17 is located at the downstream of the branch 11 and located on the upper side in the vertical direction. The third wall surface 17 is inclined toward the second wall surface 16.

In FIG. 1A, an imaginary line X extends from the first wall surface 15 with the same curvature to the position of the bypass outlet 10. The bypass outlet 10 opens such that the imaginary line X passes through the bypass outlet 10. That is, the bypass outlet 10 is extended downward in the vertical direction along the imaginary line X and opened.

The opening plane (opening plane) of the bypass outlet 10 is directed away from the branch 11. In FIG. 1A, a line Y extends perpendicularly to the opening plane of the bypass outlet 10. The line Y is directed to extend away from the branch 11. That is, the opening plane of the bypass outlet 10 is not to be directed along the mainstream toward the downstream in straight but to be directed downward in the vertical direction relative to the downstream of the mainstream.

Operation Effect of First Embodiment

Air flowing through the main passage may contain dust and partially flows into the bypass passage 6. Dust contained in air is moved with inertial force along the airflow through the bypass passage 6. In the present configuration, dust is separated at the branch 11 between the bypass passage 6 and the sub-bypass passage 7. Thus, only the air excluding dust flows into the sub-bypass passage 7. In the present embodiment, the curvature of the first wall surface 15 and the second wall surface 16 forms the airflow moving through the bypass passage 6 in the direction to be away from the branch 11. Therefore, dust moves along the airflow. In this way, dust is restricted from intruding from the branch 11 into the sub-bypass passage 7. Thus, dust is inhibited from reaching the flow rate sensor 4.

In the present embodiment, it is conceivable that the curvature of the first wall surface 15 and the second wall surface 16 may disturb airflow moving into the sub-bypass passage 7. In consideration of this, a current vane 20 is equipped in the vicinity of the inlet of the sub-bypass passage 7 in order to rectify the airflow.

Figure 2:
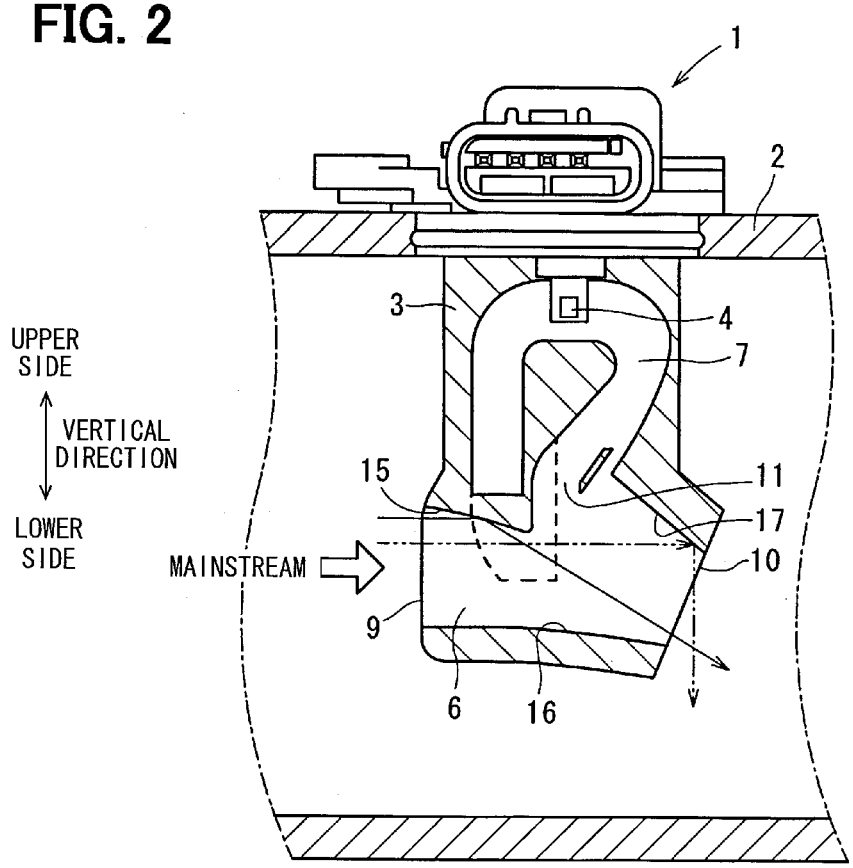
FIG. 2 is a view showing a path through which dust is discharged from the airflow measuring device according to the first embodiment.

In addition, the bypass outlet 10 opens such that the imaginary line X, which is extended from the curved line along the curvature of the first wall surface 15 to the position of the bypass outlet 10, passes through the bypass outlet 10. With the present configuration, the bypass outlet 10 is extended and opened along the imaginary line X downward in the vertical direction. As shown by the solid arrow in FIG. 2, it is conceivable that dust may move in a direction deviant from the airflow direction and may collide against the first wall surface 15 to rebound on the first wall surface 15. Even in such a case, the dust is moved toward the bypass outlet 10. In this way, the dust can be easily exhausted through the bypass outlet 10. Thus, the present configuration restricts dust form repeatedly colliding against the passage wall surface and restricts the dust from rebounding toward the branch 11.

The bypass outlet 10 is extended downward in the vertical direction along the imaginary line X and opened. With the present configuration, as shown by the two-dot chain arrow in FIG. 2, even when dust flows in a direction deviant from the airflow direction, and even when the dust collides against the third wall surface 17, the dust can be discharged from the bypass outlet 10 without hitting the second wall surface 16. That is, the downstream end of the second wall surface 16 is located on the upstream side of the bypass flow relative to the downstream end of the third wall surface 17. Therefore, even when dust collides against the third wall surface 17, the dust less possibly collides against the second wall surface 16. Thus, the dust colliding against the third wall surface 17 is easily discharged from the bypass outlet 10.

Figure 3:
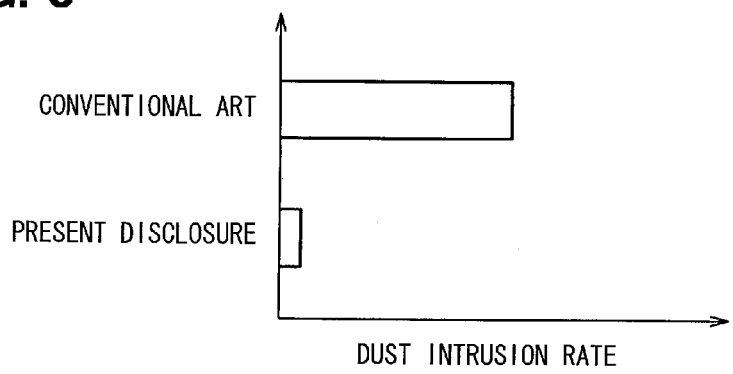
FIG. 3 is a view showing a comparison between a dust intrusion rate of the airflow measuring device according to the first embodiment and the dust intrusion rate according to a conventional art.

FIG. 3 shows a dust intrusion rate representing a rate of dust intruding into the sub-bypass passage 7 in the airflow measuring device 1 according to the present embodiment (the present disclosure) and in the airflow measuring device 100 according to a conventional example (conventional art). As shown in FIG. 3, according to the present disclosure, the dust intrusion rate is decreased by about 80% to 90%, compared with the conventional art. It is conceivable that the reduction in the dust intrusion rate is an effect caused by the passage shape enabling dust to be discharged along the airflow in the direction away from the branch 11 and enabling dust, which is not on the airflow, to be guided to the bypass outlet 10 without repeating collision against the passage wall surface.

Second Embodiment

Construction of the Embodiment

As follows, the configuration of the airflow measuring device 1 of the second embodiment will be described with reference to FIG. 4. In the following description, the difference from that of the first embodiment will be mainly described. In the present embodiment, both the first wall surface 15 and the second wall surface 16 do not curve and are substantially in parallel with the mainstream direction. Contrary, the opening plane of the bypass outlet 10 is directed to be away from the branch 11, similarly to the first embodiment.

Figure 4:
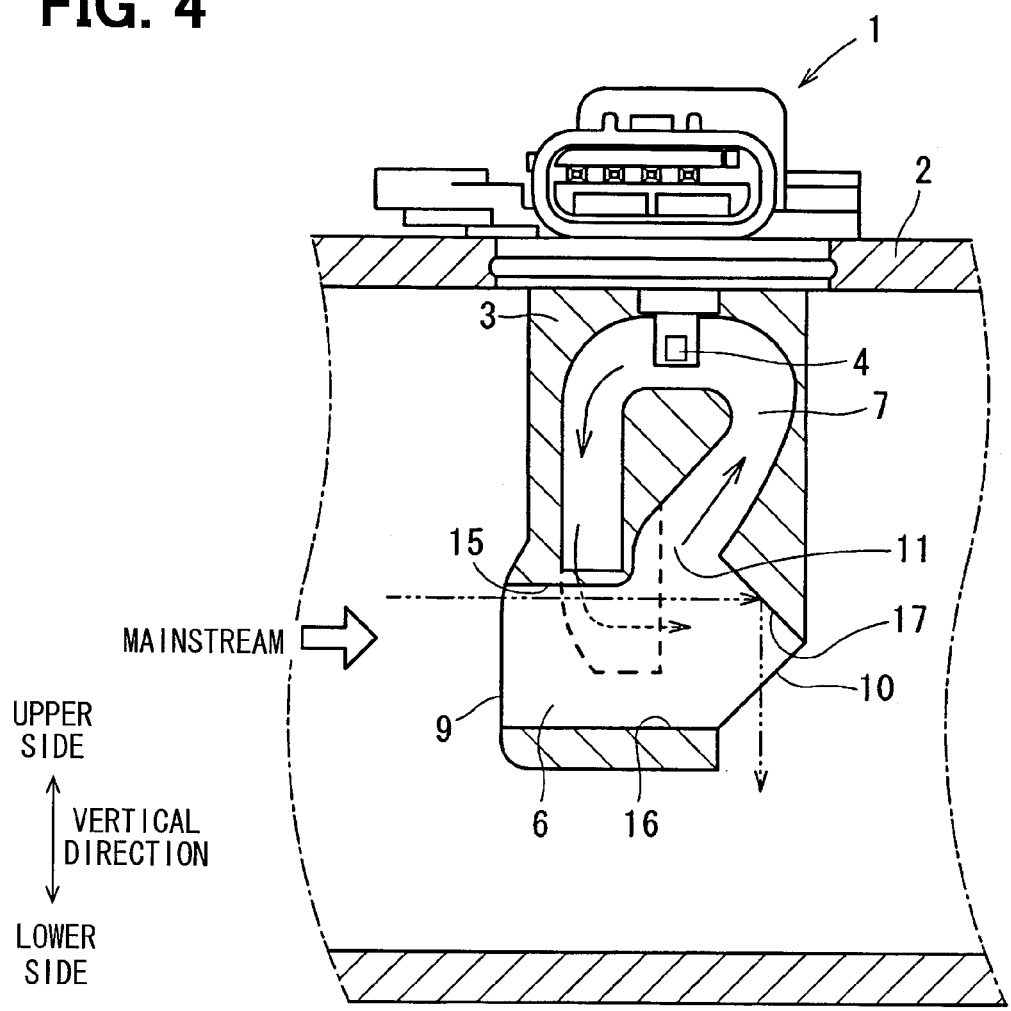
FIG. 4 is a sectional view showing an airflow measuring device according to the second embodiment.

With the present configuration, as shown by the two-dot chain arrow in FIG. 4, even when dust flows along the airflow in the bypass passage 6, and even when the dust collides against the third wall surface 17, the dust can be discharged from the bypass outlet 10 without hitting the second wall surface 16. That is, the downstream end of the second wall surface 16 is located on the upstream side of the bypass flow relative to the downstream end of the third wall surface 17. Therefore, even when dust collides against the third wall surface 17 and rebounds on the third wall surface 17, the dust less possibly collides against the second wall surface 16. Thus, the dust colliding against the third wall surface 17 is easily discharged from the bypass outlet 10.

The above-described airflow measurement device may include the housing having the bypass passage, which is configured to receive a part of air flowing through the duct, and the sub-bypass passage, which is branched from the intermediate portion of the bypass passage and configured to receive a part of air flowing through the bypass passage; and the flow rate sensor located in the sub-bypass passage and configured to detect the flow rate of air flowing through the sub-bypass passage. At the branch from the bypass passage into the sub-bypass passage, dust contained in air flowing through the duct is separated, and the dust is flown into the bypass passage.

In the passage wall surface defining the bypass passage on the upstream side of the branch, the first wall surface may be located on the side where the sub-bypass passage branches. In this case, the first wall surface may curve in the from such that the flow along the first wall surface toward the downstream moves away from the branch. In addition, a second wall surface, which is opposed to the first wall surface, curves to be away from the branch at least in a portion opposed to the branch.

The present configuration of the bypass passage forms a flow moving in the direction to be away from the branch, and dust moves along the flow. In this way, dust is restricted from intruding from the branch into the sub-bypass passage. Thus, dust is inhibited from reaching the flow rate sensor.

The housing may have the outlet of the bypass passage. In this case, the outlet may open such that the imaginary line, which is extended from the curvature defining the curve of the first wall surface to the position of the outlet of the bypass passage, passes through the outlet.

With the present configuration, even when, for example, dust collides against the first wall surface, and even when the dust rebounds on the first wall surface, the dust can be easily discharged through the outlet of the bypass passage. Thus, the present configuration restricts dust form repeatedly colliding against the passage wall surface and restricts the dust from rebounding toward the branch.

The outlet of the bypass passage may have the opening plane directed to be away from the branch.

In a configuration where the third wall surface, which is opposed to the second wall surface and located near the downstream of the bypass passage, is inclined toward the second wall surface relative to the flow direction, dust may collide against the third wall surface, and the dust may further collide against the second wall surface. Consequently, the rebound may cause the dust to move toward the branch.

Nevertheless, in the configuration where the opening plane of the outlet of the bypass passage is directed to be away from the branch, the downstream end of the second wall surface is located on the upstream side of the bypass flow relative to the downstream end of the third wall surface. Therefore, even when dust collides against the third wall surface, the dust less possibly collides against the second wall surface. Thus, the dust colliding against the third wall surface is easily discharged from the outlet.

The above structures of the first and second embodiments may be combined as appropriate. While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device comprising:
   a housing having a bypass passage, which is configured to receive a part of air flowing through a duct when the housing is mounted to the duct, and a sub-bypass passage, which is branched at a branch from an intermediate portion of the bypass passage and configured to receive a part of air flowing through the bypass passage; and
   a flow rate sensor located in the sub-bypass passage and configured to detect a flow rate of air flowing through the sub-bypass passage, wherein
   the branch from the bypass passage into the sub-bypass passage is configured to separate dust contained in air flowing through the duct and to flow the dust into the bypass passage, and
   a passage wall surface defining the bypass passage on an upstream side from the branch includes:
      a first wall surface located on a side where the sub-bypass passage branches, the first wall surface curving to direct a flow, which is along the first wall surface toward a downstream, to be away from the branch; and
      a second wall surface opposed to the first wall surface, the second wall surface curving to be away from the branch at least in a portion opposed to the branch.

2. The airflow measuring device according to claim 1, wherein the housing has an outlet of the bypass passage, the outlet opening such that an imaginary line, which is extended from a curvature, in which the first wall surface curves, to a position of the outlet of the bypass passage, passes through the outlet.

3. The airflow measuring device according to claim 1, wherein the outlet of the bypass passage has an opening plane directed to be away from the branch.

4. An airflow measuring device comprising:
   a housing having a bypass passage, which is configured to receive a part of air flowing through a duct when the housing is mounted to the duct, and a sub-bypass passage, which is branched at a branch from an intermediate portion of the bypass passage and configured to receive a part of air flowing through the bypass passage; and
   a flow rate sensor located in the sub-bypass passage and configured to detect a flow rate of air flowing through the sub-bypass passage, wherein
   the branch from the bypass passage into the sub-bypass passage is configured to separate dust contained in air flowing through the duct and to flow the dust into the bypass passage, and
   the housing has an outlet of the bypass passage, the outlet being formed such that a line, which is perpendicular to an opening plane of the outlet, is directed to be away from the branch.

5. The airflow measuring device according to claim 1, wherein the housing is inserted in the duct.

6. The airflow measuring device according to claim 4, wherein the housing is inserted in the duct.

* * * * *